(No Model.)
W. H. DREWITT.
PEN FOR EXHIBITING POULTRY.
No. 415,769. Patented Nov. 26, 1889.
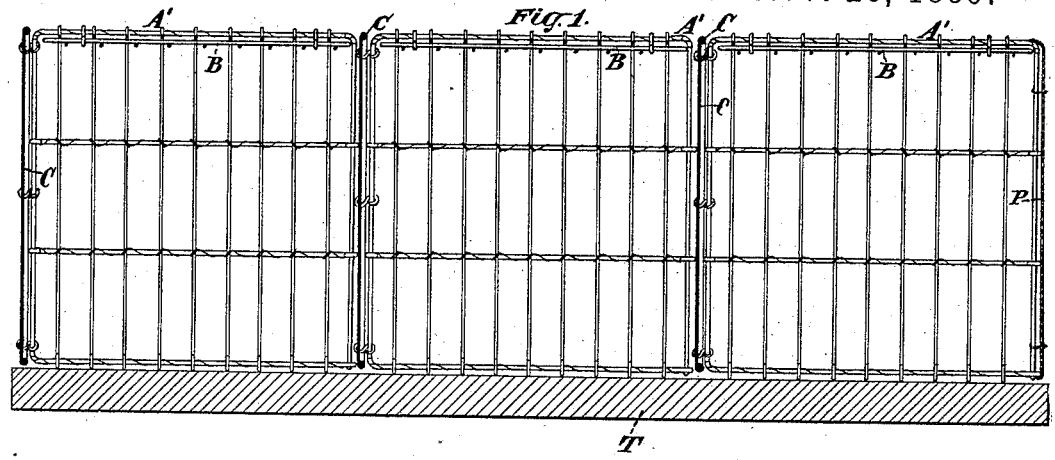
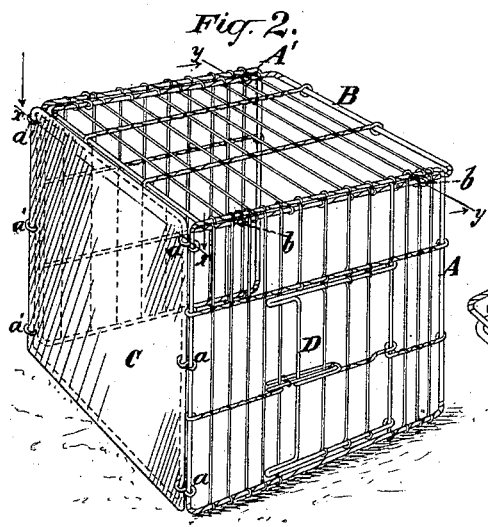
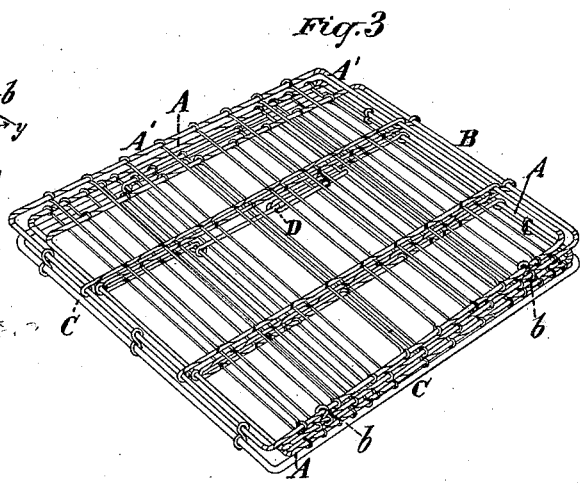
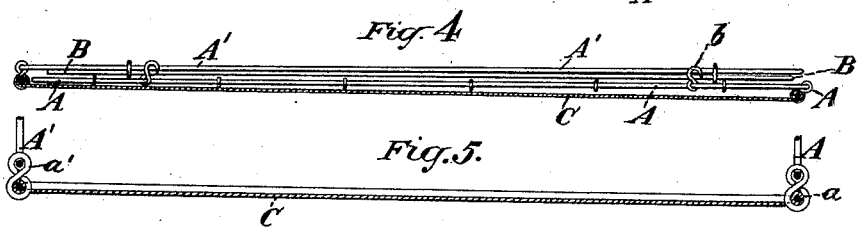
Witnesses
John Becker
Charles E. Johnson
Inventor
William H. Drewitt
by James Law
Attorney

UNITED STATES PATENT OFFICE.

WILLIAM HENRY DREWITT, OF LONDON, ENGLAND, ASSIGNOR TO SPRATT'S PATENT, (AMERICA,) LIMITED, OF NEW YORK, N. Y.

PEN FOR EXHIBITING POULTRY.

SPECIFICATION forming part of Letters Patent No. 415,769, dated November 26, 1889.

Application filed October 26, 1888. Serial No. 289,184. (No model.)

*To all whom it may concern:*

Be it known that I, WILLIAM HENRY DREWITT, a citizen of Great Britain, and a resident of London, England, have invented certain new and useful Improvements in Pens for Exhibiting Poultry, of which the following is a full, clear, and exact description, reference being had to the accompanying drawings, making a part of this specification.

My improvement refers more particularly to wire cages or pens for confining poultry, pigeons, or other similar animals when exhibited at fairs or shows, where it is desired to move the pen from place to place, but applies equally well to all pens for confining or separating small animals; and it consists, essentially, of a pen or cage formed of separate detachable sections, constructed of wire or other suitable material, that can be readily folded, so as to be easily transported from place to place and occupy but little space in storage, and that can be easily and quickly erected and made ready for use.

In the drawings illustrating my improvement, in which like letters indicate like parts, Figure 1 is a side elevation, partly in section, of my improved pen arranged in position for exhibiting the poultry, showing the side of the pens farthest from the observer. Fig. 2 is a perspective view of one of the sections of my improved pen open, ready for use. Fig. 3 is a perspective view of the section shown in Fig. 2 folded, ready for transportation or storage. Fig. 4 is an end view of the section folded, showing the back or end C in section. Fig. 5 is a sectional view of the back or end C through the line $x\ x$, Fig. 2, showing the hinges which connect the back to the sides. Fig. 6 is a view of the top of the section shown in Fig. 2 through the line $y\ y$, Fig. 2, showing the method of securing the top to the sides.

My improved poultry-pen, as illustrated in Fig. 1, consists of a series of separate detached pens or cages formed of a size to accommodate the animals confined in the same. These separate pens (shown erected and open in Fig. 2 and closed or folded in Figs. 3 and 4) are formed by the sides A and A' and top B, constructed of wire or wire-netting, and the solid back or end C, formed of thin sheet metal or other suitable material, and are open at the bottom where the pen stands on the ground or exhibiting stand or table, and at the front or end opposite the solid end C, as is shown in Fig. 2. The two sides A and A' are fastened or connected to the back or end C by the hinges $a$, Fig. 5, so that the sides can be folded against the back when the pen is folded or closed, as will be understood from Figs. 3 and 4. The top B is hinged to the side A', and fastened or connected to the opposite side by the hook $b$, Fig. 6, so that when the pen is folded or closed the top turns down inside of and against the side A', and is then folded against the back, as will be seen from Fig. 4. Hence to fold or close my improved pen the top B is first detached or unhooked from the side A and turned down against the opposite side A'. The side A is then turned back against the end C, and the side A', with the top B, is next folded over the side A, when the pen will be folded or closed, as is shown in Figs. 3 and 4.

To erect my pen and place it in position for use, the several pens or cages are first opened or unfolded, as shown in Fig. 2, and are then placed in a line on the ground or table T, with the open end of each pen next to the closed or solid end C of the adjoining pen, as will be understood from Fig. 1, which shows the sides A' of the pens with the top B connected to the same and the back or ends C between them. These solid ends thus close the open ends of the pens and form partitions between the several pens or cages, preventing the birds or animals from interfering with each other. The open end of the cage at the end of the pen or line of cages is closed by a solid end or partition P, similar to the end C, which is fastened to the sides of the cage in any convenient manner, as is shown in Fig. 1. The animals may be put into the pens through the open end; or, more preferably, a door D, Fig. 2, may be formed in one of the sides, by means of which access is had into the pen to introduce or remove the animals or attend to the same. Any number of these cages may be arranged in line, depending on the size of pen required, and two lines of cages may be used, if desired, the pens of each line being separated from those of the adjoining line where necessary by canvas or thin metallic sheets or other suitable material placed between the lines.

While I prefer to make the end or back C solid, as shown, it may be made of open material if it should be found desirable.

The pen thus constructed is light and airy, admitting perfect ventilation and an unobstructed view of the animals contained in the same, and can be easily and quickly erected ready for use, and is readily taken apart and folded, so that each cage is apart by itself and occupies but little space in transportation or storage.

What I claim as new is—

1. In a pen for poultry, formed of separate detached sections, the section having the two sides A and A', the single end C, and the top B, and open at the end where it joins the other sections, arranged and adapted to fold together, substantially as described, as and for the purpose set forth.

2. In a pen for poultry, the pen formed of a series of separate detached sections, each section having two sides, a single end, and a top, and open at one end, arranged and adapted to fold together, and erected so that the open end of one section is next to the closed end of the adjoining section, as and for the purpose set forth.

3. In a pen for poultry, the pen consisting of a series of separate pens having the sides A and A' hinged to the end C, and the top B hinged to one side and adapted to fold together, substantially as described, arranged so that the open end of one pen will be next to the end C of the adjoining pen, and provided with the end P, as and for the purpose set forth.

Dated this 10th day of September, 1888, and signed at the United States Consulate-General, London, England.

W. H. DREWITT.

In presence of—
MARTIN B. WALLER,
*Vice-Consul-General, U. S. A., London.*
S. F. CHAMBERLAIN,
*Clerk.*